(12) United States Patent
Shelton (10) Patent No.: US 6,980,384 B1
(45) Date of Patent: Dec. 27, 2005

(54) EXTENDED POSITION ERROR SIGNAL FOR ANALOG SERVO DISK DRIVE

(75) Inventor: Boyd Norvell Shelton, Ogden, UT (US)

(73) Assignee: Iomega Corporation, San Diego, CA (US)

( * ) Notice: Subject to any disclaimer, the term of this patent is extended or adjusted under 35 U.S.C. 154(b) by 164 days.

(21) Appl. No.: 10/703,754

(22) Filed: Nov. 7, 2003

Related U.S. Application Data (60) Provisional application No. 60/426,900, filed on Nov. 15, 2002.

(51) Int. Cl.[7] ............................................. G11B 20/10
(52) U.S. Cl. ....................................................... 360/39
(58) Field of Search .............................. 360/39, 25, 51, 360/78.06; 369/43, 30.16, 30.15, 59.17; 330/265; 331/78

(56) References Cited

U.S. PATENT DOCUMENTS

| | | | | |
|---|---|---|---|---|
| 4,056,788 | A | * | 11/1977 | Brown et al. .................. 331/78 |
| 4,466,089 | A | * | 8/1984 | Wachi ...................... 369/59.17 |
| 4,524,398 | A | * | 6/1985 | Fujiki ....................... 360/78.06 |
| 4,701,898 | A | * | 10/1987 | Giddings .................. 369/30.15 |
| 4,774,699 | A | * | 9/1988 | Giddings .................. 369/30.16 |
| 4,799,205 | A | * | 1/1989 | Maeda .......................... 369/43 |
| 6,587,292 | B1 | * | 7/2003 | Ashley et al. ................. 360/39 |
| 6,788,484 | B2 | * | 9/2004 | Honma .......................... 360/51 |
| 6,809,590 | B1 | * | 10/2004 | Wong et al. ................. 330/265 |

OTHER PUBLICATIONS

Fujitsu Sci. Tech, "Development of Shear-Mode Piezoelectric Microactuator for Precise Head Positioning", Dec. 2001, (8 pages).
DeCroy Data Storage, "Position Error Analysis Histograms Measure Servo Runout and On-Track Percent", date unknown, (2 Pages).
K.A.A. Makinwa et al, "Analysis of a Biphase-Based Servo Format for Hard-Disk Drives", Nov. 2000, (8 pages).
NCEMO, "Control & Measurement Electronics", www.xtrsystems.com, printed Dec. 26, 2002, (5 pages).
Terril Hurst et al., "Measurements for the PES Pareto Method of Identifying Contributors to Disk Drive Servo System Errors", Jun. 3-6, 1997, (5 pages).
Data Storage Institute, Servo Electronics Group, "Hard Disk Drive Servo Test Stand", 1997-1998, (133 pages).

* cited by examiner

*Primary Examiner*—David Hudspeth
*Assistant Examiner*—Fred F. Tzeng
(74) *Attorney, Agent, or Firm*—James T. Hagler (57) ABSTRACT

A system and method of extending the position error signal for a disk drive storage system using two digital-to-analog converters in a summing junction, including a typical A-B signal and a track error signal scaled to match a gain of the A-B signal. A track error is calculated. The track error is output to a second digital-to-analog converter. The A-B signal is inverted according to the least significant bit of the grey code of a disk track being read. The inverted A-B signal is output to a first digital-to-analog converter. The inverted A-B signal and the track error are combined using a summer to generate a combined signal. The combined signal is used to generate an extended position error signal.

19 Claims, 7 Drawing Sheets

EXTENDED POSITION ERROR SIGNAL FOR ANALOG SERVO DISK DRIVE

This application claims of Provisional Application No. 60/426,900 filed Nov. 15, 2002.

FIELD OF THE INVENTION

The present invention is directed to extended position error signals for analog servo disk drives.

BACKGROUND OF THE INVENTION

Many disk drives include a spare digital-to-analog converter (DAC) that can be used to scale and display a position error signal. The position error signal can be used to determine a current needed to center a disk read head over a target disk track. Because disk tracks are not perfectly circular, the position error signal is sampled many times per revolution to keep the disk read head centered.

Figure 1A:
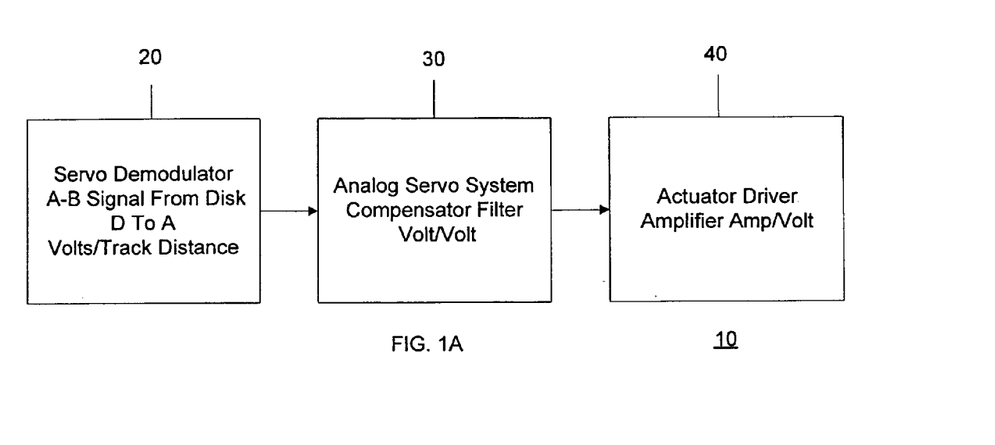
FIG. 1A is a schematic diagram of a disk drive with a conventional A-B signal.

FIG. 1A is a schematic block diagram of a disk drive 10 that uses a conventional A-B position signal. The disk drive 10 includes a servo demodulator 20, analog servo system compensator filter 30, and actuator driver amplifier 40. The servo demodulator 20 receives an A-B position signal from a disk digital-to-analog converter. The position signal may be in units of volts/track distance. The servo demodulator 20 performs an analog peak detect for servo bursts commonly referred to as A, B, C, and D.

Figure 1B:
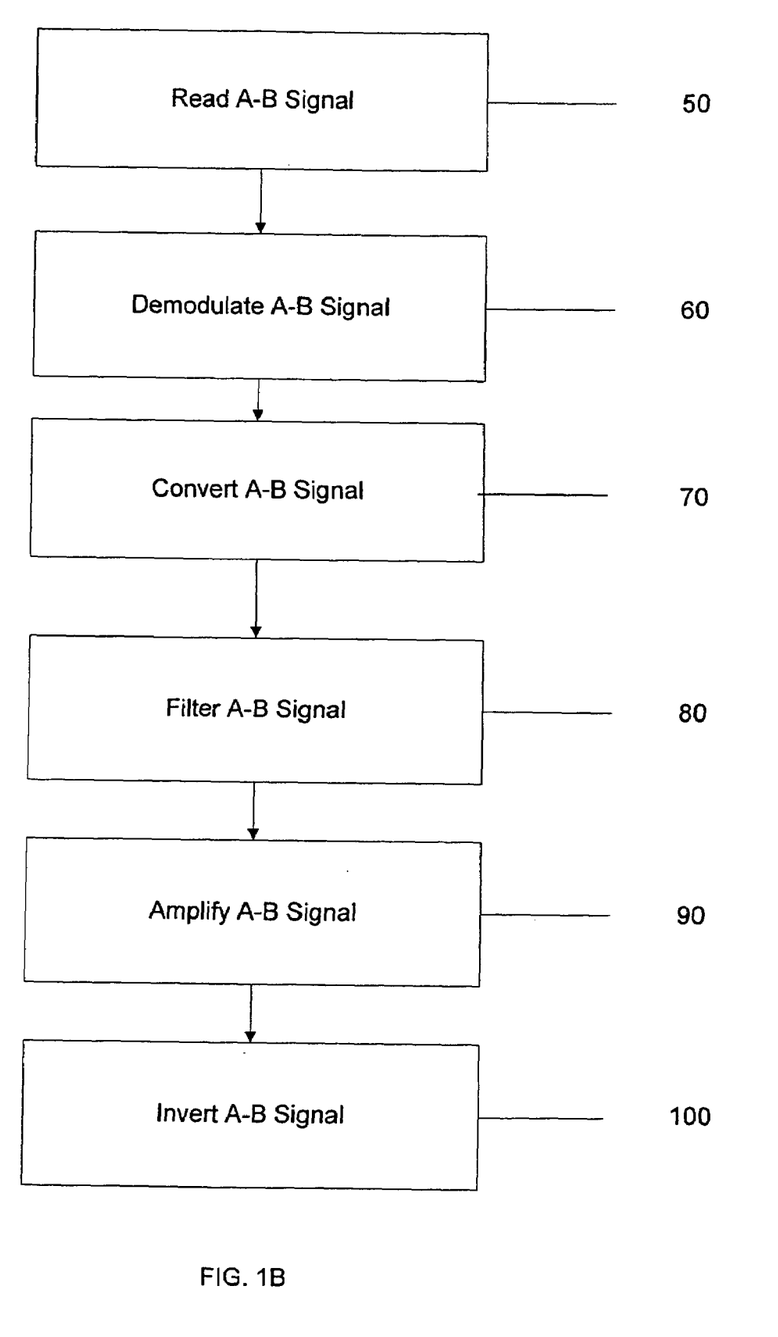
FIG. 1B is a block diagram of a conventional method of determining a position error signal.

FIG. 1B illustrates a method of determining a position error signal for an analog servo disk drive with reference to FIG. 1A will now be described. The first step, step 50, involves reading an A-B signal from a disk. The A-B signal is typically in digital form. Step 60 involves demodulating the amplitude of the A-B signal from the disk using a servo demodulator. The A-B signal is converted from a digital signal into an analog signal in step 70. Next, step 80 involves an analog amplifier filter for a servo system compensator that filters the A-B signal. In step 90, a voltage to current amplifier driving a position actuator amplifies the A-B signal.

In a disk drive with an A-B type position signal, a maximum position error signal that can be represented is ½ track. The position error signal is then inverted in step 100 to represent the signal as an all-positive representation. The inversion changes a negative portion of the signal to a positive portion essentially causing a polarity sign reversal. The sign reversal causes the system to be unstable and limits the acceptable range position servo.

Some processors neither have access to certain signals nor enough processor speed to calculate a composite position signal (made up of grey code, A-B and C-D signals) to create an extended position signal. In addition, if the extended position error is output with early saturation into an analog compensator amplifier, a very nonlinear signal results that tends to be unstable.

Accordingly, there exists a need to extend the position error signal in a typical disk drive storage system to be compatible with a limited microprocessor and an analog servo system.

SUMMARY OF THE INVENTION

The present invention alleviates to a great extent the disadvantages of the known position error signals by providing a simple system and method of extending a position error signal in a typical disk drive storage system that is compatible with a microprocessor and an analog servo system having limited capabilities and processor speed. The system uses conventional hardware and information generated by typical disk drives to extend a position error signal. The invention uses a separate servo demodulator for a track error signal generated by a processor of a disk drive in addition to a servo demodulator for an A-B signal. Preferably, a separate digital-to-analog converter is also provided for converting the track error signal to analog form. By using separate servo demodulators and digital-to-analog converters for the track error signal, a better approximation of the A-B signal results that more closely resembles a linear line.

One aspect of the present invention involves a method of extending the position error signal for a disk drive storage system using two digital-to-analog converters in a summing junction, including a typical A-B signal and a track error signal scaled to match a gain of the A-B signal. The method includes the steps of calculating a track error signal, outputting the track error signal to a second of two digital-to-analog converters, inverting the A-B signal according to the least significant bit of the grey code of the track being read, and outputting the inverted A-B signal to a first of two digital-to-analog converters.

These and other features and advantages of the present invention will be appreciated from review of the following detailed description of the invention, along with the accompanying figures in which like reference numerals refer to like parts throughout.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The invention relates to information storage devices and media, such as for example magnetic or optical media devices. In one embodiment, a hard drive with a removable media is provided and in others fixed drives are provided. One application is for use in digital cameras or digital movie cameras. Other examples of applications include personal digital assistants (PDAs), laptop computers, notebook computers, other portable electronic devices, desktop computers and storage media libraries.

Figure 2:
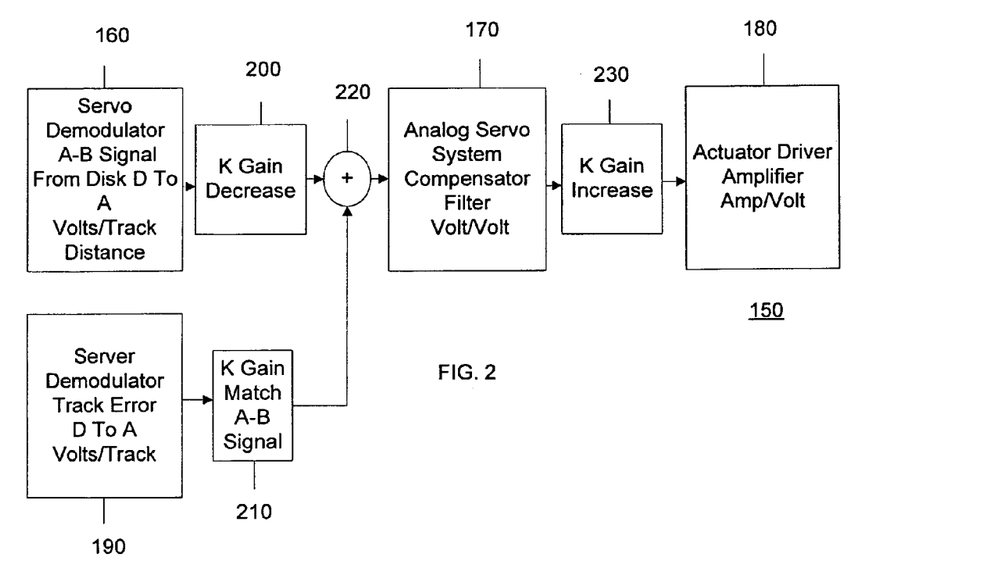
FIG. 2 is a schematic diagram of a disk drive with a combined extended position error signal in accordance with the present invention.

FIG. 2 illustrates a disk drive 150 according to an embodiment of the present invention. The disk drive 150 generates an extended position error signal using two digital-to-analog converters in a summing junction. The disk drive 150 includes a servo demodulator and digital-to-analog converter 160, analog servo system compensator filter 170, and actuator driver amplifier 180 as used in a disk drive illustrated in FIG. 1A.

The disk drive 150, however, also includes a second digital-to-analog converter 190, a gain decreaser 200, a gain matcher 210, a summer 220, and a gain increaser 230. The gain decreaser 200 is used to approximate the A-B signal more closely with a linear line. The gain matcher 210 scales a gain of the track error signal output by the second track error digital-to-analog converter 190 to match a gain of the A-B signal output by the gain decreaser 200. Output from the gain decreaser 200 and the gain matcher 210 are input into the summer 220. Output from the summer 220 is input into a compensator filter 170 of an analog servo system for filtering the A-B signal. The A-B signal output by the compensator filter 170 is input into a gain increaser 230 that increases a gain of the A-B signal by an amount that equals an amount that the gain was decreased by the gain decreaser 200. This restores an overall gain of the A-B signal to an original amount. Output from the gain increaser 230 is then input to an actuator driver amplifier 180 for processing as is known in the art.

Figure 3:
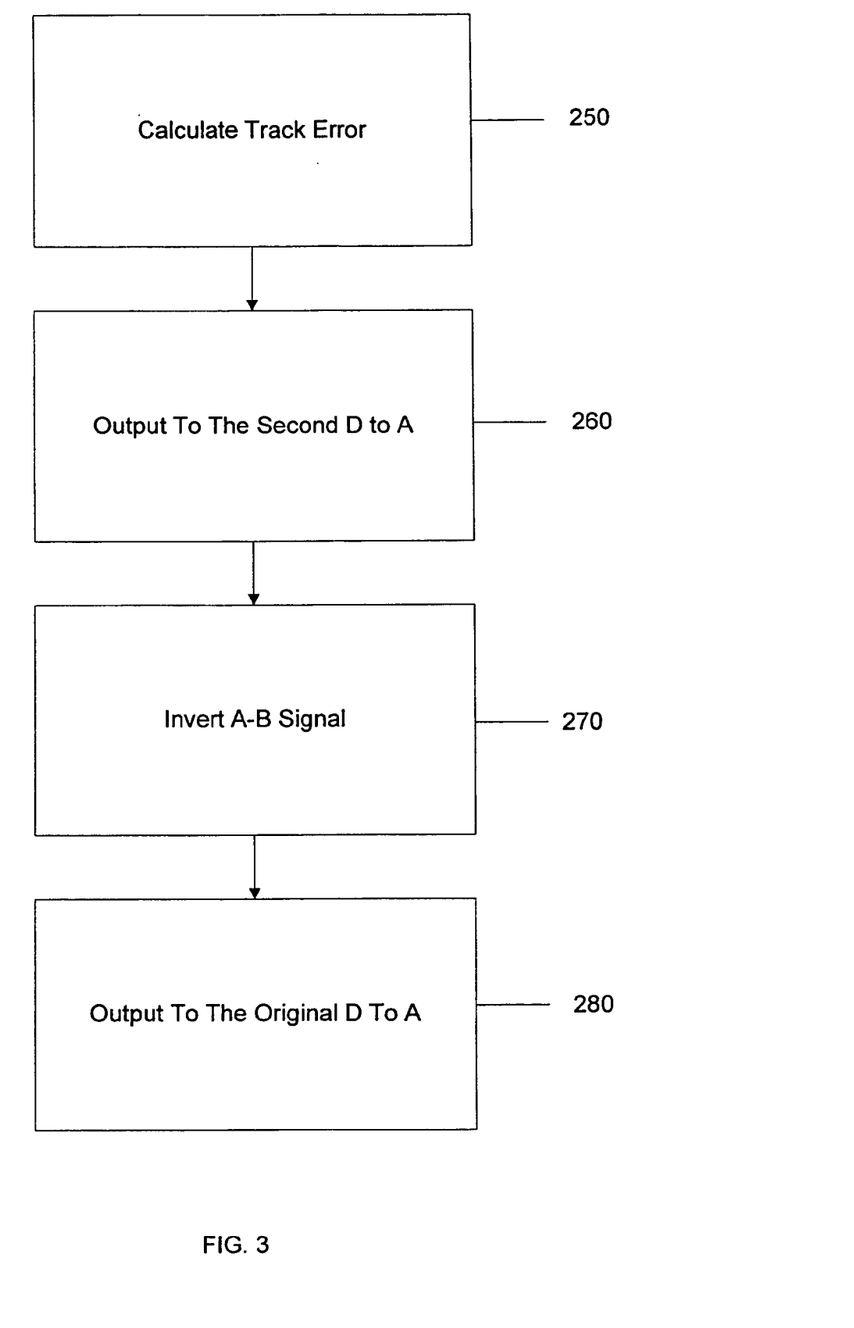
FIG. 3 is a schematic diagram of a method in accordance with the present invention.

A method of extending the position error signal for a disk drive storage system using at least a first and a second digital-to-analog converter in a summing junction is illustrated in FIG. 3. Step 250 involves calculating the track error. The track error indicates a difference in position between a target position and an actual position of a disk read head. Step 260 involves outputting the track error to a second digital-to-analog converter. Next, step 270 involves inverting an A-B signal according to the least significant bit of the grey code of the track being read. Step 280 outputs the inverted A-B signal to a first digital-to-analog converter. The method provides a simple manner of extending a position error signal using a track error calculated by a processor. By calculating a track error signal independent of the A-B signal, a better approximation of a relative position of a disk read head with respect to a target position may be obtained.

Figure 4:
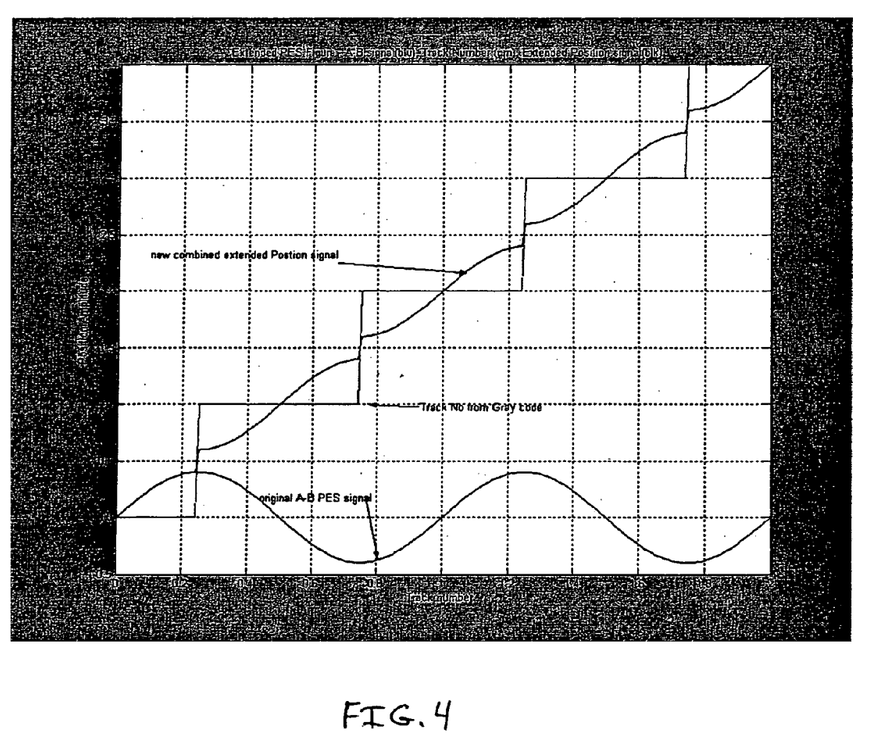
FIG. 4 is a chart showing the conventional A-B signal and the combined extended position signal.

FIG. 4 is a chart showing a conventional A-B position error signal generated by, for example, a disk drive as illustrated in FIG. 1A and a combined extended position signal generated by, for example, a disk drive illustrated in FIG. 2. As illustrated, the conventional A-B position error signal is a sinusoidal wave having both positive and negative portions (above and below a zero (0) position amplitude) for increasing track numbers. The combined extended position signal, however, is a substantially linear line with only positive amplitudes as track numbers increase. Therefore, as a disk read head moves from a zero (0) track position a first end to a maximum track position at a second end, the combined extended position signal represents each increasing track position as a positive position amplitude. As the disk read head moves from the maximum track position at the second end to the zero (0) track position at the first position, the combined extended position signal represents each decreasing track position as a smaller position amplitude.

As illustrated in the graph, adding the A-B signal and the track position error signal creates a stair step wave. The stair step wave increases at each maximum and minimum points of the conventional A-B position error signal. It should be noted that the slopes of the combined extended position signal between the step increases and the minimum and maximum points of the conventional A-B position error signal are substantially equal. This shows that the combined extended position signal represents the conventional A-B position error signal as only a positive signal.

A gain of a servo loop may need to be increased after an analog compensator to allow for an extended range of a non-saturating position error signal input to the compensator. This gain change also allows for the compensator amplifier to handle the extended position signal without saturating, thus creating a more stable control system.

Figure 5:
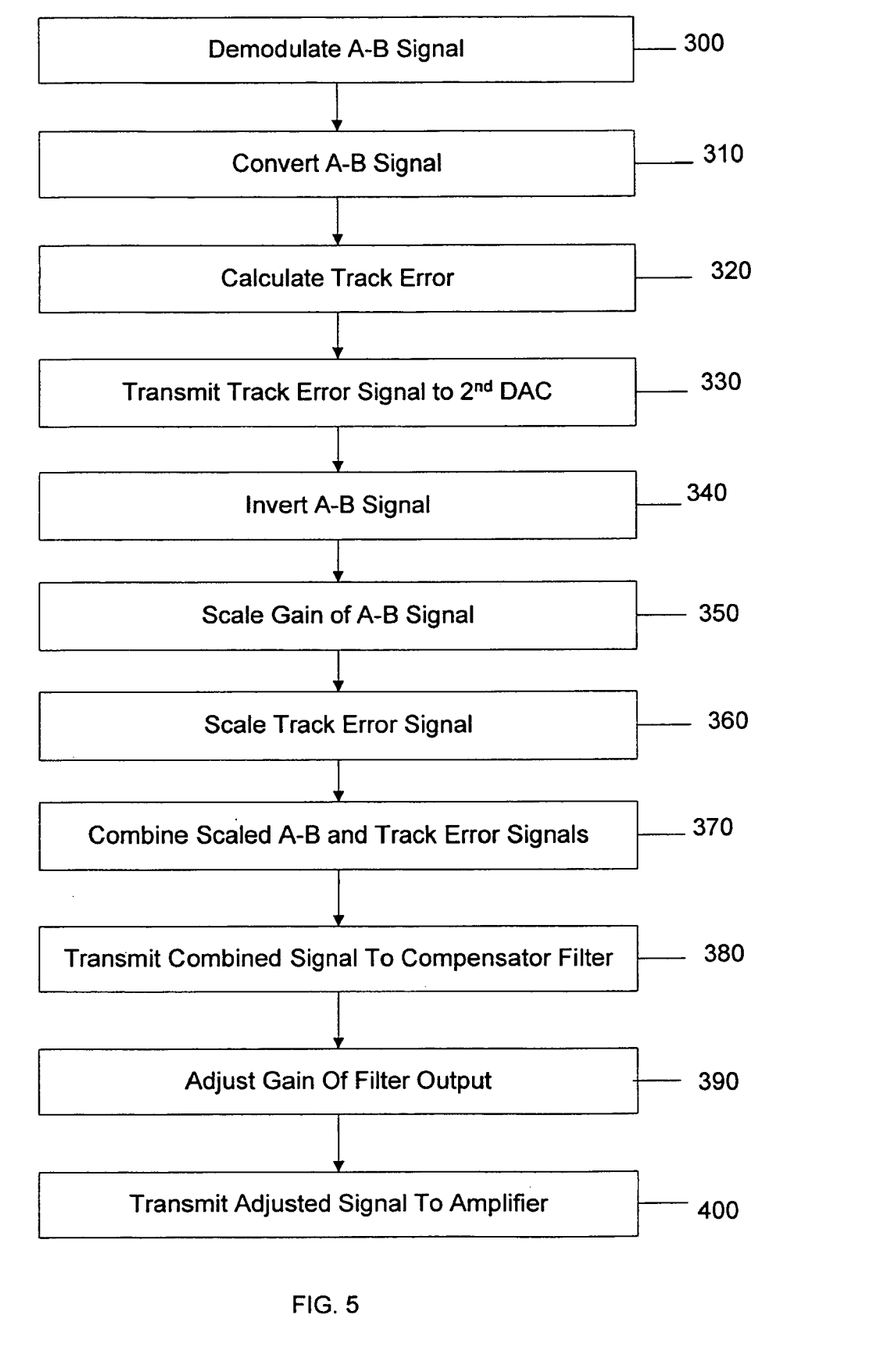
FIG. 5 is a block diagram of a method of extending a position error signal in accordance with one embodiment of the present invention.

FIG. 5 illustrates a method of extending a position error signal according to one embodiment of the invention. The method enables a position signal to be calculated using processors and analog servo systems having limited capabilities and speed. The method does not require additional hardware other than standard amplifiers and typical components such as those shown in FIG. 1. The method may begin at step 300 by demodulating an A-B signal obtained from a disk. The A-B signal may be in digital form. The A-B signal is preferably demodulated using a servo demodulator. The servo demodulator is used to position, for example, an access arm on the disk. The demodulated A-B signal is then converted into an analog form by a first digital-to-analog converter in step 310.

A track error signal may be calculated substantially simultaneously with steps 300 and 310 in step 320. The track error signal indicates a difference between a target position and an actual position of a disk read head. The track error signal may be generated using any known processor. The track error signal is converted into analog form using a second digital-to-analog converter in step 330. The processor in step 340 may invert the A-B signal. The A-B signal is preferably inverted according to the least significant bit of grey code of a track being read. A gain of the A-B signal is scaled to provide a better approximation of a linear line in step 350. Decreasing the amplitude size and step voltage of the A-B signal scales the gain. A gain of the track error signal is then scaled match the gain of the scaled A-B signal in step 360.

The scaled A-B signal and the scaled track error signal are then combined in step 370 preferably using a summer. The summer adds the scaled signals and transmits the combined signal to a compensator filter of an analog servo system in step 380. The compensator filter operates in a conventional manner. A gain of an output of the compensator filter, however, is adjusted in step 390 so that an overall gain of the A-B signal is the same. Because the A-B signal gain was decreased in step 350, the gain of the compensator filter output is increased in step 390 by an amount that the A-B signal gain was decreased in step 350. The adjusted signal is then transmitted to an actuator driver amplifier in step 400. The actuator driver amplifier may operate in a known manner.

Figure 6:
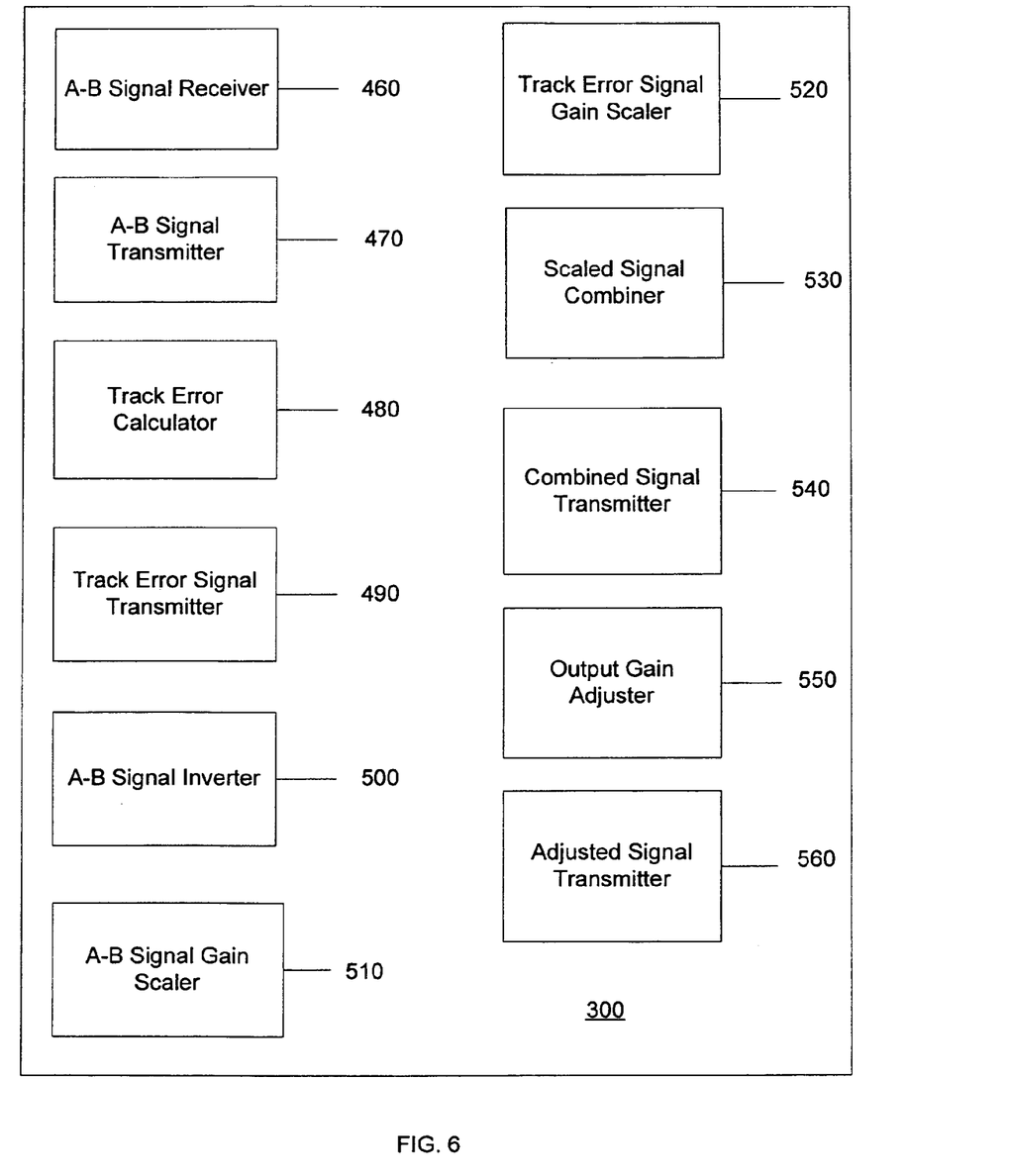
FIG. 6 is a block diagram of a system for extending a position error signal in accordance with one embodiment of the present invention.

FIG. 6 illustrates a system 450 for extending a position error signal according to one embodiment of the invention. The system 450 may include an A-B signal demodulator 460 that demodulates an A-B signal obtained from a disk. The A-B signal may be converted into analog form, if necessary, using by an A-B signal converter 470. The A-B signal converter is preferably a first digital-to-analog converter. The A-B signal is typically represented as a sinusoidal wave versus distance on a track. A track error signal calculator 480 may be used to calculate a difference in track position between a target position and an actual position of a disk read head obtained from the disk. The track error signal may be converted to analog form using a track error signal converter. Preferably, the track error signal converter is a second digital-to-analog converter.

The A-B signal may be inverted using an A-B signal inverter 500. The A-B signal, in sinusoidal form, may be inverted such that all positive and no negative slope portions represent the sinusoidal wave. A gain of the A-B signal is then scaled to better approximate a linear line using A-B signal gain scaler 510. This is accomplished by decreasing a size of the amplitude of the sinusoidal wave. A gain of the track error signal is then scaled to match a gain of the A-B signal using a track error signal gain scaler 520. The scaled track error and A-B signals are then combined using a combiner 530. The combiner 530 is preferably a summer. The combined signals are transmitted to a compensator filter of an analog servo system using a combined signal transmitter 540.

A gain of the output from the compensator filter is adjusted to compensate for the scaling performed by A-B signal gain scaler 510 using a gain adjuster 550. The adjusted gain is transmitted to an actuator driver amplifier using an adjusted signal transmitter 560.

Figure 7:
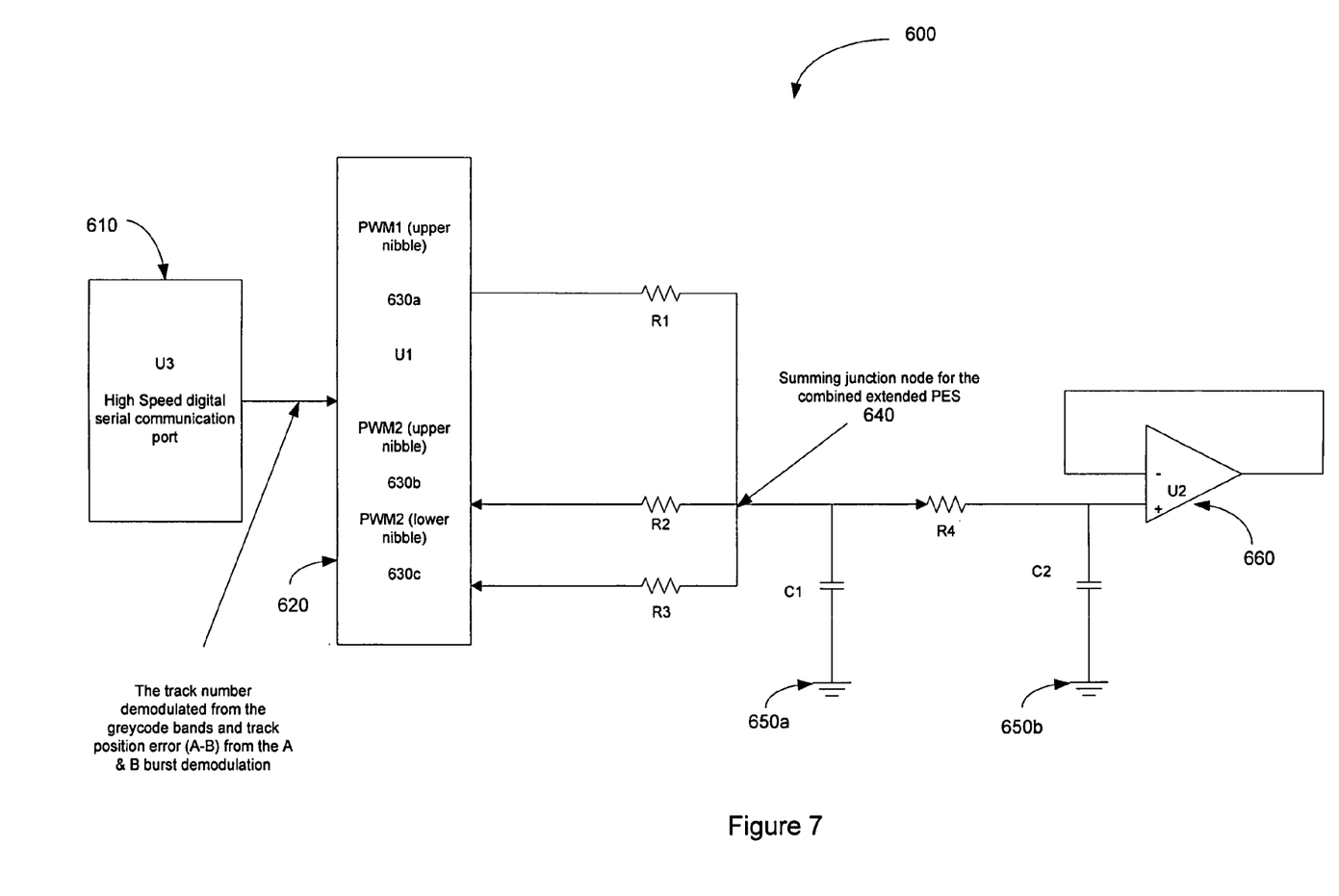
FIG. 7 is a schematic of a system for extending a position error signal in accordance with one embodiment of the present invention.

FIG. 7 illustrates a system 600 for extending a position error signal according to one embodiment of the invention. The system 600 may include a high-speed digital serial communication port 610 that may be used to receive an A-B signal. The A-B signal is demodulated to reveal a track number and a track position error. The track number and the track position error (A-B) are transmitted to a disk drive application specific integrated circuit (ASIC) 620. The ASIC 620 includes an upper nibble 630a that modulates the track position error. The ASIC 620 also includes upper and lower nibbles 630b, 630c that modulate the A-B signal. Preferably, the upper nibbles and lower nibble use pulse-width modulation. The track position error is transmitted to a digital-to-analog converter that includes a resistor R1. The A-B signal is transmitted to a subtrack digital-to-analog converter that includes resistors R2 and R3. Outputs from the digital-to-analog converters are transmitted to a summing junction node 640. The summing junction node combines the track position error and A-B signal to generate a combined extended position error signal. The combined position error signal passes through low-pass filters 650a, 650b before arriving at a amplifier 660. The amplifier 660 is used to buffer the combined amplified signal of the combined position error signal. The combined position error signal is used as a feedback loop for the amplifier 660.

Thus, it is seen that a method for extending the position error signal in a typical disk drive storage system to be compatible with a limited microprocessor and an analog servo system is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A method of extending a position error signal for a disk drive storage system using at least a first and a second digital-to-analog converter in a summing junction, comprising:
   calculating a track error;
   outputting a track error signal based on the track error calculated to a second digital-to-analog converter;
   inverting an A-B signal; and
   outputting the A-B signal to a first digital-to-analog converter.

2. The method of claim 1, wherein the inverting an A-B signal comprises inverting the A-B signal according to the least significant bit of the grey code of a disk track being read.

3. The method of claim 1, further comprising:
   demodulating at least one of the A-B signal and the track error signal.

4. The method of claim 1, further comprising:
   converting at least one of the A-B signal and the track error signal to analog form.

5. The method of claim 1, further comprising:
   scaling a gain of the A-B signal.

6. The method of claim 5, further comprising:
   scaling a gain of the track error signal.

7. The method of claim 6, further comprising:
   combining the A-B signal scaled and the track error signal scaled to generate a combined signal.

8. The method of claim 1, further comprising:
   transmitting the combined signal to a compensator filter.

9. The method of claim 8, further comprising:
   adjusting a gain of an output of the compensator filter.

10. The method of claim 1, further comprising:
    converting at least one of the A-B signal and the track error to analog form.

11. A system of extending a position error signal for a disk drive storage system using at least a first and a second digital-to-analog converter in a summing junction, comprising:
    a track error calculator that calculates a track error;
    a track error output that outputs a track error signal based on the track error to a second digital-to-analog converter;
    an inverter that inverts an A-B signal; and
    an A-B signal output that outputs the A-B signal inverted to a first digital-to-analog converter.

12. The system of claim 11, wherein the inverter inverts the A-B signal according to the least significant bit of the grey code of a disk track being read.

13. The system of claim 11, further comprising:
    at least one demodulator that demodulates at least one of the A-B signal and the track error signal.

14. The system of claim 11, wherein at least one of the first digital-to-analog converter and the second digital-to-analog converter converts at least one of the A-B signal and the track error signal to analog form.

15. The system of claim 11, further comprising:
    an A-B signal scaler that scales a gain of the A-B signal.

16. The system of claim 15, further comprising:
    a track error scaler that scales a gain of the track error.

17. The system of claim 16, further comprising:
    a combiner that combines the A-B signal scaled and the track error scaled to generate a combined signal.

18. The system of claim 11, further comprising:
    a transmitter that transmits the combined signal to a compensator filter.

19. The system of claim 18, further comprising:
    an adjuster that adjusts a gain of an output of the compensator filter.

* * * * *